United States Patent [19]

Dasgupta

[11] Patent Number: 5,699,500
[45] Date of Patent: Dec. 16, 1997

[54] RELIABLE DATAGRAM SERVICE PROVIDER FOR FAST MESSAGING IN A CLUSTERED ENVIRONMENT

[75] Inventor: Ranjan Dasgupta, Naperville, Ill.

[73] Assignee: NCR Corporation, Dayton, Ohio

[21] Appl. No.: 456,434

[22] Filed: Jun. 1, 1995

[51] Int. Cl.$^6$ .................................................. G06F 12/00
[52] U.S. Cl. ............................................................ 395/180
[58] Field of Search ....................................... 395/180, 600, 395/650, 700, 726, 728, 730; 364/280.6

[56] References Cited

U.S. PATENT DOCUMENTS

| | | | |
|---|---|---|---|
| 4,553,205 | 11/1985 | Porchia | 364/300 |
| 4,648,030 | 3/1987 | Bomba et al. | 364/200 |
| 4,661,905 | 4/1987 | Bomba et al. | 364/200 |
| 4,706,190 | 11/1987 | Bomba et al. | 364/200 |
| 4,720,782 | 1/1988 | Kovalcin | 364/200 |
| 4,763,249 | 8/1988 | Bomba et al. | 364/200 |
| 4,769,768 | 9/1988 | Bomba et al. | 364/200 |
| 4,787,031 | 11/1988 | Karger et al. | 364/200 |
| 4,787,033 | 11/1988 | Bomba et al. | 364/200 |
| 4,833,599 | 5/1989 | Colwell et al. | 364/200 |
| 4,920,477 | 4/1990 | Colwell et al. | 364/200 |
| 4,926,375 | 5/1990 | Mercer et al. | 364/900 |
| 4,961,139 | 10/1990 | Hong et al. | 364/200 |
| 4,962,463 | 10/1990 | Crossno et al. | 364/518 |
| 5,016,159 | 5/1991 | Maruyama | 364/200 |
| 5,023,907 | 6/1991 | Johnson et al. | 380/4 |
| 5,029,164 | 7/1991 | Goldstein et al. | 370/95.1 |
| 5,043,886 | 8/1991 | Witek et al. | 364/200 |
| 5,057,837 | 10/1991 | Colwell et al. | 341/55 |
| 5,058,006 | 10/1991 | Durdan et al. | 364/200 |
| 5,109,512 | 4/1992 | Bahr et al. | 395/650 |
| 5,117,352 | 5/1992 | Falek | 395/575 |
| 5,163,131 | 11/1992 | Row et al. | 395/200 |
| 5,175,852 | 12/1992 | Johnson et al. | 395/600 |
| 5,202,971 | 4/1993 | Henson et al. | 395/425 |
| 5,327,556 | 7/1994 | Mohan et al. | 395/600 |
| 5,339,427 | 8/1994 | Elko et al. | 395/725 |
| 5,355,453 | 10/1994 | Row et al. | 395/200 |
| 5,423,044 | 6/1995 | Sutton et al. | 395/725 |
| 5,490,270 | 2/1996 | Devarakonda et al. | 395/600 |
| 5,553,239 | 9/1996 | Heath et al. | 395/187.01 |
| 5,596,754 | 1/1997 | Lomet | 395/726 |

OTHER PUBLICATIONS

Digital Technical Journal, "The VAX/VMS Distributed Lock Manager", by William E. Snaman, Jr. et al.; pp. 29–44, Sep. 1987.

*Primary Examiner*—Robert W. Beausoliel, Jr.
*Assistant Examiner*—Stephen C. Elmore
*Attorney, Agent, or Firm*—James M. Stover

[57] ABSTRACT

A datagram messaging service for a distributed lock manager implemented on a clustered computer system including a plurality of processing nodes interconnected through a network. The messaging service establishes and maintains a plurality of virtual circuits between the processing nodes, a single virtual circuit connecting each pair of processing nodes within the clustered computer system. A distributed lock manager driver is included within each processing node, the driver including a communication service providing for the generation of datagrams comprising lock manager instructions for transmission to other processing nodes within the clustered computer system via said virtual circuits and also providing for the receipt of datagrams generated and transmitted by the other processing nodes.

12 Claims, 4 Drawing Sheets

RELIABLE DATAGRAM SERVICE PROVIDER FOR FAST MESSAGING IN A CLUSTERED ENVIRONMENT

The present invention relates to a computer system having a cluster of processing elements, and more particularly to a low latency, high performance messaging service for a clustered computer system.

BACKGROUND OF THE INVENTION

Within a computer system, a cluster is a collection of processing elements that is capable of executing a parallel, cooperating application. Each processing element in a cluster is an independent functional unit, such as a symmetric multiprocessor server, which is coupled with the other cluster elements through one or more networks, e.g., LANs, WANs, I/O buses. One type of cluster system is described in The VAX/VMS Distributed Lock Manager, by W. E. Snaman, Jr. and D. W. Theil, published in Digital Technical Journal, September 1987, and in U.S. Pat. No. 5,117,352, entitled "MECHANISM FOR FAIL-OVER NOTIFICATION" issued to Louis Falek on May 26, 1992 and assigned to Digital Equipment Corporation.

A parallel cooperating application in the context of a cluster executes on multiple cluster nodes and processes a shared object such as a database. A lock manager is required by such an application to synchronize and coordinate its activities on the shared object. Specifically, such a parallel application defines a set of locks, each of which control a portion or portions of the shared object(s) that the parallel application will process. Each parallel instance of the application is in agreement with each other with respect to the interpretation of the set of locks as defined. When an instance of the parallel application needs to access, e.g., read, modify, etc., a portion of the shared object, it needs to obtain a lock from the Lock Manager that provides it access privileges relevant to its desired operation on that portion of the shared object. Since the set of locks need to be accessed from within any of the instances, it must be a global entity, and the lock manager by definition needs to be a global or clusterwide resource.

A typical clustered system configuration running parallel database server application, using a Distributed Lock Manager, is depicted in FIG. 1. The system, as shown, includes multiple processor units 101-1 through 101-4 interconnected through a network 103, such as an Ethernet of Fiber Distributed Data Interface, and connected through a shared SCSI bus 105 to one or more database storage units 107-1 and 107-2.

The need for parallel applications on today's open systems has been generated from two basic requirements:

Increased throughput of the application, and

High availability of the application.

A clustered system must accordingly be designed such that no system element or component represents a single point of failure for the entire cluster. If the Lock Manager executed off of any one node of the cluster, or on a piece of dedicated hardware, then a failure of that node or the hardware would adversely affect all instances of the parallel application, since it cannot survive without the services of a Lock Manager. If on the other hand, the Lock Manager is distributed, then the surviving nodes can be designed to recover the lock database upon a node failure, and allow the parallel application on these nodes to continue their processing.

A Distributed Lock Manager (DLM) should also be capable of scaling its throughput capabilities along with the addition of nodes to the cluster. Since a DLM is not confined to a single node or a subset of nodes, it can take advantage of the increase in processing power along with the increase of nodes within the cluster.

Further, a DLM should allow for even distribution of lock management overhead across each functional element of the cluster on which the parallel application is executing. This way, no single node or subset of nodes are unevenly burdened with the responsibility of lock management.

OBJECTS OF THE INVENTION

It is therefore an object of the present invention to provide a new and useful messaging service for a clustered system.

It is another object of the present invention to provide such a messaging system for utilization within a distributed lock manager application.

It is yet another object of the present invention to provide such a messaging system which provides sequenced, reliable delivery of message packets from any source to any destination within the clustered system.

It is still a further object of the present invention to provide a distributed lock manager for a clustered computer system including a datagram messaging system which maintains a network of virtual circuits for the routing of datagrams between nodes within the clustered system.

SUMMARY OF THE INVENTION

There is provided, in accordance with the present invention, a datagram messaging service for a distributed lock manager implemented on a clustered computer system including a plurality of processing nodes interconnected through a network. The messaging service establishes and maintains a plurality of virtual circuits between the processing nodes, a single virtual circuit connecting each pair of processing nodes within the clustered computer system. A distributed lock manager driver is included within each processing node, the driver including a communication service providing for the generation of datagrams comprising lock manager instructions for transmission to other processing nodes within the clustered computer system via said virtual circuits and also providing for the receipt of datagrams generated and transmitted by the other processing nodes.

In the described embodiment, each processing node within the clustered computer system includes a shared memory segment for storing lock status information for the processing nodes, the shared memory segment being shared by a plurality of application processes operating within the plurality of processing nodes to access the lock status information stored therein; a shared library providing the plurality of application processes access to the shared memory segment to request and be granted a lock if a lock is available; and a DLM control program providing exception handling for any exception which occurs with respect to a lock managed within the processing node.

Additional embodiments of the invention described herein include means for testing the integrity of a virtual circuit between a sending processing node and a receiving processing node; means for generating and transmitting an acknowledge signal in response to receipt of a datagram from a sending processing node by a receiving processing node, the acknowledge signal being attached to a datagram being transmitted by the receiving processing node to the sending processing node; means for limiting the transmission of additional datagrams when a predetermined number of datagrams have been transmitted without the receipt of acknowledge signals for said transmitted datagrams; means for sequencing datagrams received from sending processing nodes by a receiving processing node so that the order in which received datagrams are processed at the receiving processing node corresponds to the order in which the received datagrams were transmitted by the sending processing nodes; and means for combining a predetermined number of message packets together into a single message shuttle for transmission from a sending processing node to other processing nodes as well as means for separating a single message shuttle received from other processing nodes by the sending processing node into individual message packets.

The above and other objects, features, and advantages of the present invention will become apparent from the following description and the attached drawings.

DETAILED DESCRIPTION OF THE PREFERRED EMBODIMENT

Figure 1:
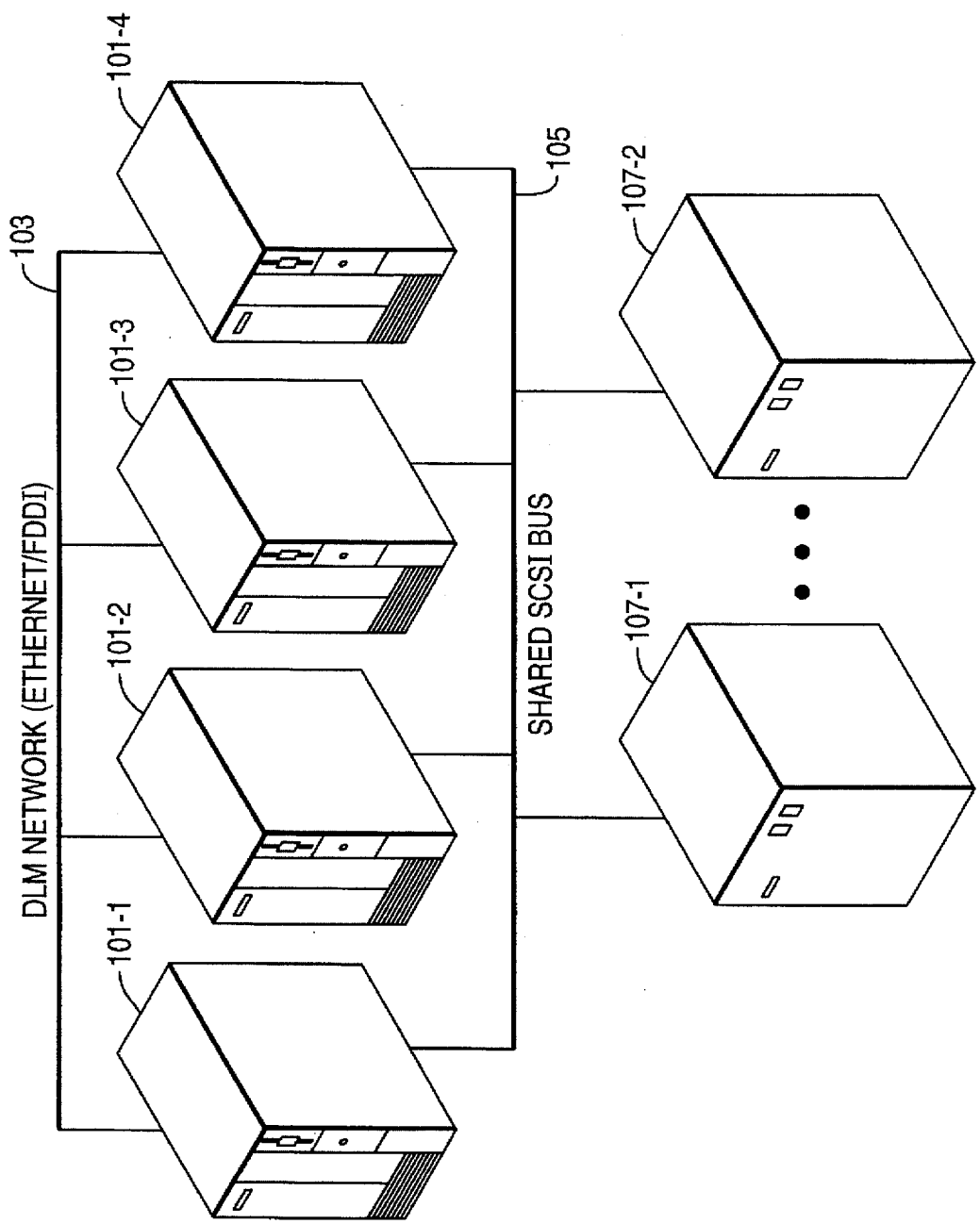
FIG. 1 is a simple block diagram illustration of a parallel cooperating application operating in a clustered computer system.

Functional Overview of a Distributed Lock Manager

A DLM executing on a cluster of nodes has the following functional responsibilities:

Lock Management. This constitutes the primary responsibility of the DLM. In this mode, the DLM serves in providing the basic lock management functionality as defined by the DLM API to which it is written.

Maintain Cluster Membership. The DLM is the sole keeper of the set of nodes that constitutes a cluster at a given point in time. This membership may be different from the total set of nodes that are physically present, and defines the set of nodes on which the parallel application can execute. The DLM will redefine this set of nodes after an event occurs which causes a change in the current cluster membership (such as a system boot, node failure, etc.).

Recover and Redistribute the Lock Database. When a node failure occurs, all locks that were being managed by the DLM instance on that node need to be recovered. The process of recovery of these locks involve:

1. Reconstitution of the exact status of these locks at the time of node death.
2. Redistribution of the management of these locks to other functional nodes of the new cluster.
3. Resumption of lock requests that were in-flight from DLM client processes to the dying node(s).
4. Release of all locks that were being held by the dead node prior to failure; thereby allowing other pending lock requests to be resolved.

The DLM goes through a similar set of events when a new node joins an existing cluster. The sequence of events that occur within the DLM as a result of a change of cluster membership (node death or node join) is termed as the cluster reconfiguration sequence in the rest of the document.

Resources and Locks

It is important to understand the terms resources and locks in the context of the DLM. A resource is the fundamental named object maintained by the DLM. A parallel application uses a resource to represent a shared object such as a disk block, a shared data structure, a database row etc. This resource (maintained by the DLM) is then used by the application to control access privileges to the shared object that the resource is coordinating. It is important to understand here, that although the DLM is the primary keeper of each resource, it is ignorant of the actual shared object associated with the resource; this interpretation is maintained by the parallel application.

A lock (in the context of the DLM) is used by the parallel application to obtain various access rights to the resource as described above. The Oracle DLM API defines 5 levels of access rights that can be obtained on a resource, through the use of API functions on a lock belonging to the resource. While a resource is a global entity, a lock is process specific, and denotes that process' interest in the resource.

Master and Shadow Resources/Locks. Each resource (and its associated locks) managed by the DLM has a designated node (within the current cluster), where it is managed. The representation of the resource on the node managing the resource is called the master copy of the resource. Similarly, the node that is managing the resource/locks is termed the master node for that resource. If a DLM client holds a lock on a resource that is not locally mastered, then a copy of the resource and lock is kept on the local machine. This copy of the resource/lock is called the shadow copy. It is interesting to note that a shadow copy of a resource will contain only those locks (on the resource) that are held by locally resident DLM processes. A master copy of a resource however, will contain all locks that are held by DLM client processes on a clusterwide basis. A master copy of a resource is used to keep track and grant locks on a clusterwide basis, while shadow resources and locks are maintained to keep track of individual locks held by a local process and for reproduction of the lock database in the event of a failure of the master node.

Local and Remote Resources/Locks. A local resource/lock refers to the copy of the resource/lock that is found in the lock database local to the DLM client process. A local resource/lock can be either a master or a shadow copy. If the resource in question is locally managed, then the local copy is the master copy, and in such a situation, a shadow copy for that lock is non-existent. If the resource in question is not locally managed (i.e., is managed on a remote node) then the local copy is a shadow copy. By definition, the remote copy of this resource (residing on the resource's master node) is the master copy.

Implementation of a Distributed Lock Manager

The functionality of the DLM during normal operation is built upon the following basic models.

The Shared Lock Database Model. In order to implement a low-latency low-overhead DLM, it is necessary to analyze the path traversed by a DLM lock request, and propose a path that is optimal in terms of latency and overhead. A typical implementation of the DLM consists of a "DLM server" process running on each cluster node, providing lock services for users on that node and for remote users sending requests for locks mastered at that node. This is a client-server implementation, where all lock requests generated on a node need necessarily pass through a server. This model has certain drawbacks:

Since all local request and remote requests directed to a node pass through a single process, it can be a potential bottleneck, especially if both the number of CPUs within a node and/or the number of nodes in the cluster increase.

Each lock request generated on a node necessitates at least two context switches (for both local and remote locks), for its resolution.

Another implementation scheme is a "fully Kernelized" DLM model. This scheme has a number of advantages; in particular it solves the inherent problems (as noted above) of the client-server scheme. However, such a scheme can impose a larger overhead and latency for resolution of local locks, by requiring a DLM user to issue an UNIX system call for every lock request. Also, if this kernel component needs to also integrate the communication needs of the DLM, it is likely to be a streams-based driver. Such an implementation is also likely to have higher latencies for local lock resolutions, as we wait for the streams scheduler to schedule its service procedures.

Figure 2:
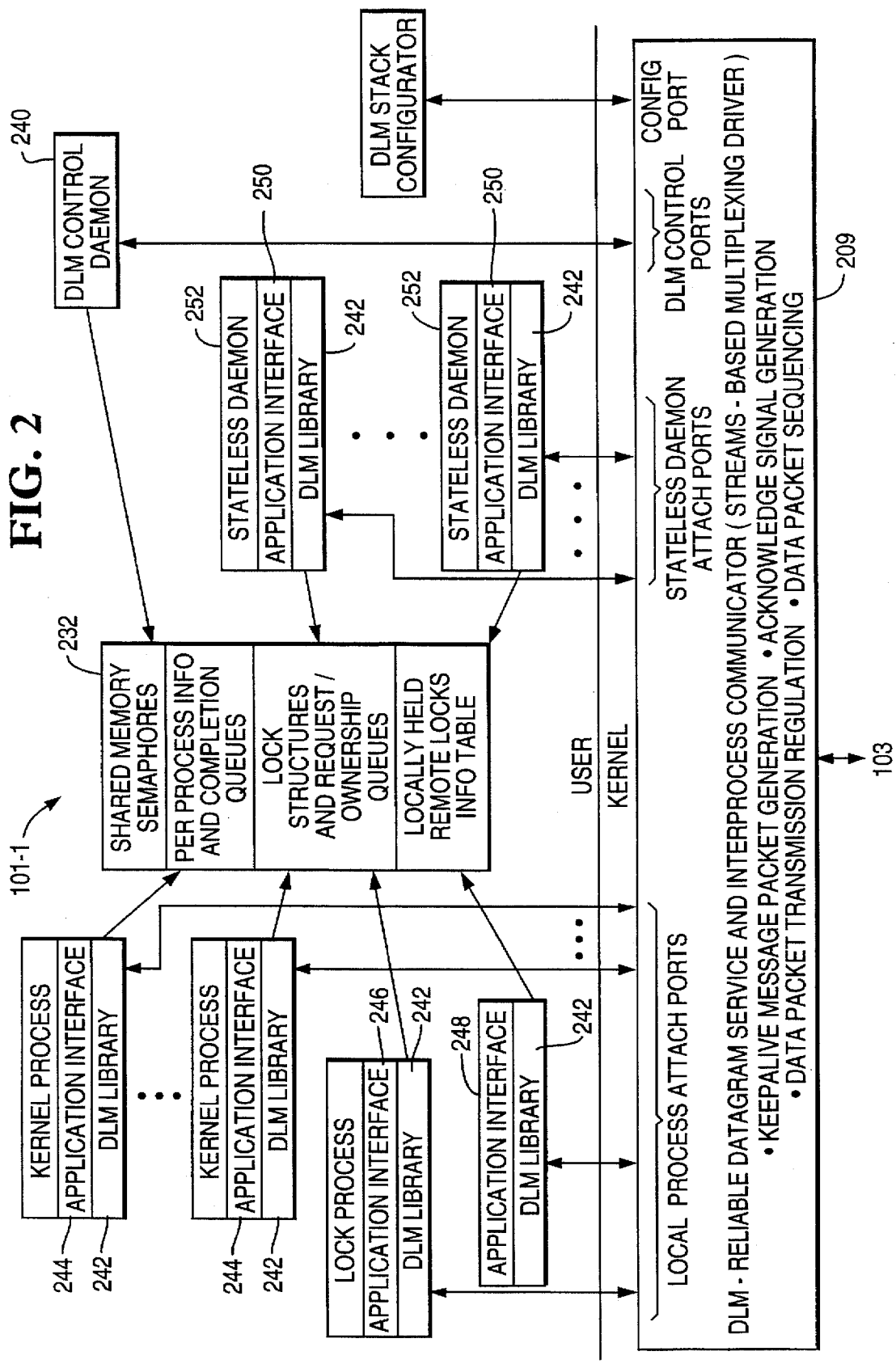
FIG. 2 provides a functional block diagram of the distributed lock manager (DLM) components resident on a local node within a clustered computer system, in accordance with the present invention.

The DLM implementation described herein attempts to optimize the overhead/latency requirements for local and remote lock requests, using a two-prong sharing scheme, a shared lock database, and a shared communication channel (the merits of the latter are discussed in the following subsection). In the shared lock database scheme, all DLM user and daemon processes have equal access to all lock and lock-related structures in the DLM's lock database resident on the local node. FIG. 2 provides a functional block diagram of the DLM structures resident on node 101-1 within the clustered system of FIG. 1. The description which follows should be understood to apply as well to the remaining processing nodes, 101-2 through 101-4, shown in FIG. 1.

Node 101-1 includes a local shared memory segment 232, which can be a random access memory. Local shared memory segment 232 stores status and control information for all the locks which are managed locally by the processing node 101-1. Further, local shared memory segment 232 stores status information for all the remote locks that processing node 101-1 accesses on the other nodes within the cluster. The local shared memory segment 232 stores data related to the shared locks and to the user processes accessing the locally managed locks.

Local shared memory segment 232 stores shared memory semaphores, process information and completion queues, lock structures and request/ownership queues, and information about local processes that request or own remote locks on processing nodes 101-2 through 101-4. Thus, local shared memory segment 232 stores the information necessary to manage the local locks assigned to processing node 101-1, as well as, a shadow record of each local process that accesses a shared object that is managed by a remote lock on a remote processing node 101-2 through 101-4.

A DLM control daemon 240 provides handling for any exception that occurs within processing node 101-1. DLM control daemon 240 only handles exceptions and not the normal lock request/grant/completion data, and thus, is not a bottleneck for DLM operations. The normal lock request/grant/completion sequence is managed by DLM library 242. DLM library 242 is a dynamically linked process which is linked to each process requesting a locally managed lock. Applications and local processes have respective application interfaces 244, 246 and 248 to link to the DLM library 242. The DLM library 242 allows each application or local process to directly access shared memory segment 232 to request a lock of a shared object without changing from the context that the application or local process is running in. This manner of operation prevents time consuming context switching in order to process a local lock request.

For local applications or processes requesting a remote lock, the DLM library 242 provides access to the remote lock information locations within shared memory segment 232 to record the request and also provides direct issuance of a datagram to the remote lock within one of the other processing nodes 101-2 through 101-4. As with the local lock accesses, all of this is performed without a change of context from that of the application or process making the remote lock request.

Remote request received by processing node 101-1 via datagrams generated by one or more of the other processing nodes 101-2 through 101-4 within the cluster are processed by a group of stateless daemons 252. Each stateless daemon 252 has a respective interface 250 that receives datagrams from remote processing nodes 101-2 through 101-4 and performs the lock access for the remote application or process. Because there can be many stateless daemons available within each processing node 101-1 through 101-4, many remote lock requests can be processed in parallel.

The DLM system described herein provides for very low latency/overhead characteristics for resolution of local locks, since no context switches or system calls are required for such requests. This scheme coupled with the shared communication strategy (as discussed in below) is also the optimal strategy for resolution of remote lock requests. The components of the DLM implementation shown in FIG. 2 will be described in greater detail below.

The Shared Communication Model. As discussed in the previous section, a local lock request can be resolved within the context of the DLM shared library. However, if the lock is remotely mastered, a request needs to be sent to the master node and a response received back from it. If a traditional client-server DLM implementation is used, we would need at least 2 context switches on the local node to accomplish this.

A more optimal scheme would require the DLM shared library to have the capability of directly sending the lock request to the master node over a network, and subsequently directly receiving the response back from the said node. If a standard protocol package such as TCP/IP or OSI were to be used for this purpose, a number of issues arise:

Each DLM user process (in the case of Oracle, this means each Oracle user) needs to maintain a virtual circuit to some daemon process on every other node in the cluster. If for example, there are 500 users per node on a 4-node cluster, the total number of virtual circuits originating from local users within a node would be 1500. Further, if there is a server process(s) that handles remote requests from DLM client processes on remote nodes, the total number of VCs originating from such clients and terminating onto the said server process would be once again 1500. While it is unclear whether a single UNIX process can handle that many VCs, it is more alarming to contemplate the amount of overhead that will result from the management of this number of VCs within each node of the cluster.

The overhead of executing TCP/IP for lock management traffic is substantial, since a request/response traverses 3 layers of protocol processing before it reaches the network or before it is delivered to the desired user process. This level of protocol sophistication is both unnecessary and costly for the needs of the DLM. Since the DLM operates on a single LAN, routing features of the protocol are unnecessary.

While being very general in nature, a standard protocol package such as TCP/IP cannot be tailored to certain specific needs of the DLM, as we shall encounter in the proceeding sections.

The DLM implementation described herein employs a streams-based DLM driver 209 that encompasses a communication service that is tailor-made and optimized for the specific needs of the DLM. This communication service maintains one virtual circuit (VC) for each remote node in the cluster. In the above example of a 4-node cluster, the number of VCs maintained on each node would be 3, and is independent of the number of client processes. These VCs are shared by all the DLM client processes and daemon processes on that node. From the point of view of the client and daemon processes, each such process establishes a single stream to the communication service. Using this stream, the above processes can directly access the network and send data packets to any other node in the cluster. The user process formulates the data packets, stamps the node id of the destination node and hands over the packet to the communication service. The communication service in turn is responsible for guaranteeing reliable, sequenced delivery of these user datagrams to the destination node, with the lowest possible overhead. This feature of sharing a set of VCs for all DLM users/daemons on a particular node provides the users with a Reliable Datagram Service for communicating with the other nodes. This communication feature within the DLM driver is termed as the Reliable Datagram Service Provider (RDSP).

A detailed description of the DLM implementation shown in FIG. 2 will now be provided, followed by a detailed description of the Reliable Datagram Service Provider (RDSP).

SHARED MEMORY

In order to implement a shared lock database model for the DLM, it is necessary to store all DLM locks and lock related structures in a shared memory segment 232, so that it is accessible to all DLM daemons and client processes. The DLM shared memory segment serves this need.

Shared Memory Contents

Data structures included within the DLM shared memory segment include shared memory header structures and Resource/lock and DLM client related structures.

Shared Memory Header. The shared memory segment is a virtual contiguous section of the address space of each process that connects with the DLM. The memory segment is carved into a header section that stores general information regarding the DLM and its peer nodes, while the body section stores all the data structures that are used to represent resources, locks, hash vectors, process slots etc. The shared memory header contains the following data structures:

Stateless daemon information. The number of such daemons, their respective states during cluster reconfiguration, statistical information etc.

Cleanup daemon information. The pid of the cleanup and its status.

Node information. The status of each other node in the cluster, their quiesce status during reconfiguration, the value of the MAC address of the networking card through which the DLM communicates.

Memory segment information. The virtual address, size and key of the shared memory segment used by the DLM Log file information. The virtual address and number of log files used by the DLM.

Resource/Lock and DLM Client Related Structures. A portion of the shared memory segment contains Resource/Lock and DLM client related structures which are used to allocate resource, lock, hash bucket, convert and process structures. These structures are used during the functional mode of the DLM, i.e., the active phase, during which the DLM is actively fielding lock requests from DLM clients.

Equal Access of the Lock Database

While it is intuitively obvious from the concepts of shared memory, that all processes having access to this memory segment can access and manipulate all DLM lock and lock related structures, it is important to emphasize the power of such a configuration. The data structures representing locks and processes are setup in a manner that, while only an individual DLM client process can submit a lock request, it may be resolved by any of the following entities:

The DLM client itself, i.e., the process that submitted the request.

A stateless daemon on the node on which the client resides.

The control daemon.

Any other peer DLM client process.

This is feasible due to a concept called an equal-access done queue. Each DLM client process has a process slot that represents the client. Within the process slot there are two queues, an activity queue and a done queue. Locks belonging to the DLM client are queued on these queues. A combination of the locks on these two queues account for all the locks owned by the process. A lock that does not have any responses pending to the client is resident on the activity queue. If a lock request on a particular lock is processed by any one of the above processes, the completion is posted within fields in the lock and is then appended onto the done queue. The requesting DLM client process is then supplied with a signal. During processing of the signal, the client will run through its done queue, performing end processing on each lock that it encounters. After end processing on a lock is completed by the client, it is moved back to the activity queue.

SHARED LIBRARY

A DLM shared library 242 is linked into all DLM clients and daemon processes.

Library Components

The Oracle API. The DLM shared library supports the Oracle DLM API as defined in "The Oracle Lock Manager" by Chuck Simmons, June, 1992. All features required by Oracle Parallel Server Version 7.0.16 are supported. The Oracle API consists of a set of interface functions that serve to attach/detach with the DLM and perform synchronous and asynchronous lock operations.

Request Processing and Response Generation. The DLM library has a set of core routines that perform the basic lock management functions.

Library Utilities. The functionality contained in the API library is partly implemented through a set of utility functions that manipulate the lock database. This set of utilities are invoked by a user process, a stateless daemon or the control daemon. Utilities have been designed such the logic can be shared amongst users and daemon processes to the extent possible.

Signal Handling and Response Completion. All responses for on remote operations arrive directly back to the requesting user process. Within the DLM library, both synchronous and asynchronous requests are implemented through the asynchronous version of the request. All responses are hence asynchronous events, and are handled through a signal handling function. The DLM is capable of generating any specific signal or preference; the current signal is identified as SIGUSR1. The SIGUSR1 signal is generated for both local and remote responses. For asynchronous responses on local locks, the third party process responsible for performing the completion uses the kill() system call to post a signal to the requesting process. A response on a remote lock request is always asynchronous in nature, since the request needs to be sent over a network to a remote node. Such a response is delivered on the RDSP read stream of the user process. The DLM driver uses the psignal() kernel utility to post a signal to the user, after placing the response packet on the read stream.

When a user process enters the DLM signal handler, it performs two primary activities:

1. It reads off response packets from the DLM read stream, posts these completions onto the completion slots of the corresponding locks and enqueues these locks onto the done queue of the process.
2. The responses for local locks have already been posted onto the locks by the process that performed the response completion. The signal handler now scans the done queue (containing both local and remote completions) and delivers these response completions to the user, by calling the user-supplied end functions. The mechanisms for slotting and response handling are further analyzed below.

Deadlock Detection. The DLM library utilities also provide routines that are used by the control and stateless daemons to perform distributed deadlock detection on pending lock convert requests.

Library Features

Concurrent Use by Users and DLM Daemons. The DLM library is written in a manner that multiple threads of execution may continue in parallel (within the context of user processes and DLM daemon processes) and process the lock database in parallel. This feature is of particular interest for multiprocessor systems, where multiple user processes are executed in parallel. This feature also minimizes the number of context switches required to process lock requests, by providing direct lock access to user processes.

Sequencing. As described above, the DLM library provides for parallel access to the lock database by DLM user and daemon processes. This parallel access mechanism does result in a more complicated DLM design, and the need for response sequencing is one such factor. Let us take an example to illustrate this need. A DLM user process (p1) up-converts a remote lock. The stateless daemon on the remote master node processes this up-convert request and passes the response down to RDSP. At the same time, another DLM user process (p2), on the same node where the lock is mastered, tries to up convert, finds that it is being blocked by p1, and sends p1 a notify message via RDSP. Now, the notify message, although generated after the up-convert reply, may overtake the up-convert reply, since these two messages are on independent streams going down to RDSP. If an overtake does take place, RDSP will be presented with the notify message prior to the up-convert response, and will maintain this order while presenting these messages to process p1. Process p1 will however, find this in error since a notification (corresponding to a particular lock level) would have reached it before the convert response for that lock level has been seen. Such situations of "overtaking" cannot be avoided, since the packets were presented to RDSP through independent streams which are scheduled independently. The situation can be remedied through the use of a sequencing ticket. As mentioned earlier, these packets were in fact generated chronologically in the correct sequence, but were interposed before being presented to RDSP. The sequencing ticket allows the sender of a response packet to associate a ticket number for the packet, as and when it is generated. This ticket number is maintained in the shared memory segment, and is accessed under semaphore protection. The interpretation of this sequencing ticket number is done by RDSP, which ensures that sequenced packets are sent out in the order as reflected by the sequence number within the packet.

DAEMONS

Control Daemon

The DLM Control Daemon 240 is the central point of administration and control for the DLM instance on a node. It is executed initially to bring up the DLM on a node, and serves a multitude of functions, which are summarized in the following sections. The most voluminous function (codewise) is the cluster reconfiguration activity, which is covered in detail in the next chapter. The Control Daemon employs a state machine architecture as its primary structure. The responsibilities of the Control Daemon are as follows:

DLM configuration and startup. The Control Daemon is the first process to start executing when the DLM is being brought up. Initially, it reads the DLM configuration file and sets up the DLM instance in accordance to parameters defined therein.

Cluster Reconfiguration. The Control Daemon serves as the single point of control for the cluster reconfiguration activity.

Timeout processing. Converting locks that have a timeout associated with them are put in a timeout queue by either the requesting process or a stateless daemon working on behalf of the requester. The Control Daemon oversees the activities of the timeout queue at periodic intervals, and takes necessary action in a timely fashion.

Process death cleanup. When a DLM user process dies abnormally, i.e., without performing a detach operation on the DLM, the Control Daemon is notified of its death by the DLM driver. The Control Daemon then assumes the responsibility of activating and conducting the cleanup/detach operation on behalf of the dead process.

Initiate deadlock detection. The initiation of deadlock detection is similar to timeout processing. All converting lock requests with deadlock detection are placed in a separate queue. After a fixed period of elapsed time, the control daemon starts the deadlock detection process by initiating deadlock detection functions in the DLM library, and sending out query packets across the network.

Third party requests. The default action for this scenario requires that all third party lock requests be processed by the control daemon. When a DLM user process downconverts a lock, or issues a conflicting upconvert, it may generate responses for other DLM users. Due to complications in the latch cleanup stage, it was initially decided to handle all such third party responses in the context of the Control Daemon. When the Control Daemon receives such a request through an unsolicited message from the DLM driver (in response to a ioctl() from the DLM user), it scans the resource under consideration and generates all necessary responses.

Administrative command support. The Control Daemon is the sole point of control for all administrative commands. This daemon uses its control stream to the DLM driver to startup and shutdown the DLM. It also provides status information regarding DLM state and lock throughput by reading necessary information stored in the DLM shared memory area.

Stateless Daemon(s)

The Stateless daemons 252 are viewed as a pool of daemons that are available primarily for the purpose of processing remote requests. The name of these daemons are indicative of the fact that these daemons do not carry around state information on a per request basis. When a stateless daemon receives a request, it will execute this to completion; affecting various status information within the shared memory area, and generating response packets. However, once the processing of a request is complete, there is no memory of this request within the context of the stateless daemon, and it is now available to process the next request.

Remote Request Processing. The Stateless daemon processes all types of remote requests including attach, open, open_convert, convert, cancel, close, deadlock_query, deadlock_ack and detach. It is optimized to reuse the logic present in the DLM shared library (that are used by DLM clients) for processing of such requests.

Lock Redistribution and Sweeping. The stateless daemons are also used during the cluster reconfiguration for redistribution of resource/lock/proc structures. In this mode, their activities are coordinated by the Control Daemon.

Cleanup Daemon

The cleanup daemon provides cleanup services aimed at the DLM shared memory segment on each node. Specifically, after an abnormal DLM client process death, the data structures in shared memory may be left in an inconsistent state, since the client may have died while in the process of modifying shared data structures. The cleanup daemon is invoked after such an abnormal death, and is responsible for restoring sanity within the shared data structures that were being accessed by the dead process at the time of death. This cleanup procedure is termed as "latch cleanup".

DLM DRIVER

The DLM driver 209 is a UNIX Kernel component of the DLM implementation described herein. Although it serves a number of functions such as process registration, interprocess communication etc., its primary purpose is to provide communication services for the DLM. This communication service assumes the existence of an interconnect fabric assessable through a streams-based DLPI style 2 driver.

Process Registration and Tracking

The DLM driver provides a base for process registration within the DLM client/daemon community. Initially, the Control Daemon registers with the DLM Driver for the specific DLM instance that it represents. Subsequently, other DLM daemon and user processes can register with the DLM driver. The driver keeps track of all processes attached to the DLM and handles the following responsibilities, depending on the process type:

Control Daemon. The control daemon is the first process to register for a given DLM instance. If the Control daemon is not up, attaches from any other process type is denied. The control daemon structure within the driver contains instance specific information (i.e., address and size of shared memory segment, link list of stateless daemons, link list of client processes, datagram sequencing list etc.). Upon death of the control daemon, the specific instance represented by it is considered shut down—consequently, the DLM driver marks streams of all other processes as closed as down, clears out all virtual circuits and waits for all attached processes to terminate.

Stateless Daemons. The DLM driver keeps track of all stateless daemons for each instance by maintaining a list associated with the control daemon information. Stateless daemons are special resources, in that all remote request datagrams arriving at a node for a specific instance are hashed to a stateless daemon for processing. Upon death of a stateless daemon, the control daemon is notified. This results in the control daemon aborting, resulting in an instance shutdown.

Cleanup Daemon. The DLM driver keeps track of the cleanup daemon for each instance. The death of the cleanup daemon is treated similarly to the death of a stateless daemon.

DLM clients. Each DLM client is registered with the DLM driver, and maintains a private read/write stream to it through which it sends requests and receives back responses. Upon death of a DLM client (without a formal detach), the DLM driver notifies both the cleanup and control daemons.

Reliable Datagram Service

Need for a Reliable Datagram Service. The name Reliable Datagram Service attempts to describe the nature of communication service provided by the DLM driver 209. While attempting to characterize the nature of data communication services required by the DLM clients and daemons, it was observed that the services provided by standard protocol stacks such as TCP/IP, OSI etc. were not ideally suited to the needs of the DLM, for the following reasons.

Datagram support. DLM clients are constantly generating lock requests and subsequently getting back the responses. For minimized context switching, it is optimal to be able to send out the request packets to their respective destinations, directly from the context of the DLM client process. This is in comparison to having a communication daemon that funnels out all the out bound packets from a node, and receives and demultiplexes all the responses back to the originators. We can easily see that such a design will introduce 2 context switches just to get the request/response packets in and out of the network. However, since these lock requests are directed randomly to different nodes (depending on the mastership of these locks), it is necessary for each client to be able to send reliably to any node in the cluster on demand. The notion of holding a VC to every node in the cluster for each DLM client process is impractical, since there are 4-6 nodes in a cluster and potentially hundreds of clients. The overhead of just maintaining that many VCs are likely to overwhelm any system. The concept of a datagram service allows a process to send a packet to any node in the cluster by simply stamping the node's address on the packet and handing it down to the networking driver.

Reliability. Most commercially available datagram services inherently provide unreliable data transfer qualities. An unreliable datagram service is not usable by an application such as the DLM since, even if lock requests were to be retried, they may lose the order in which they were initiated, which is of prime importance. As utilized within the present system, this communication service is used not only for requests/responses, but also for lock redistribution and all other inter-DLM communication needs, and for which reliability is a requirement.

Low overhead. In order for a DLM to be high-performance, its data communication layer needs to be lightweight and optimized to its needs. In particular, commercially available protocol stacks are not optimized to solely provide reliable datagram service, and may contain extra protocol layers for routing, relaying, partitioning/coalescing of user data etc., all of which are not necessary for the DLM. A truly optimized protocol for the DLM is possible only if it were specifically designed to its needs.

Sequentiality. In order to maintain the sanity of the lock database, and to provide a coherent view to the DLM client, all requests/responses from a client needs to be processed strictly in the same order in which they were presented to the DLM. Also, all responses need to be returned to the user in proper sequence. The communication service for the DLM must hence ensure reliable and properly sequenced delivery of datagram packets.

Shared Virtual Circuits and Reliability. In order to support reliable, sequenced end-to-end communication of data packets, it is necessary to have the notion of a virtual circuit. In the scenario of the Reliable Datagram Service Provider (RDSP), these virtual circuit endpoints are setup and maintained within the confines of RDSP. These virtual circuits are then used to provide a reliable datagram service to the DLM. A virtual circuit has the following characteristics:

End-to-end data acknowledgment.
Reordering of data packets for sequentiality.
Sliding window protocol for data packets in transit.
Retransmission of lost or corrupted data packets.
Heartbeat mechanism to ensure that circuit is live.
End-to-end flow control.

Figure 3:
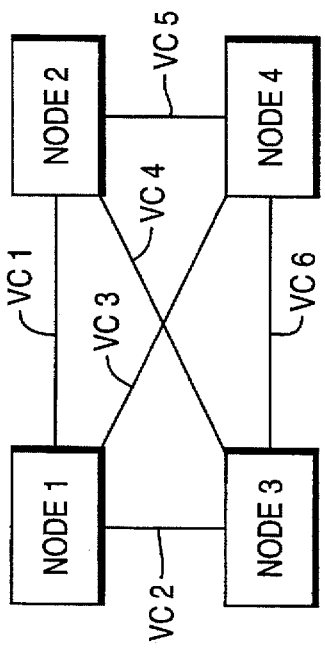
FIG. 3 is a simple block diagram illustration of a four node cluster and the virtual circuit connections between the nodes in the cluster.
Figure 4:
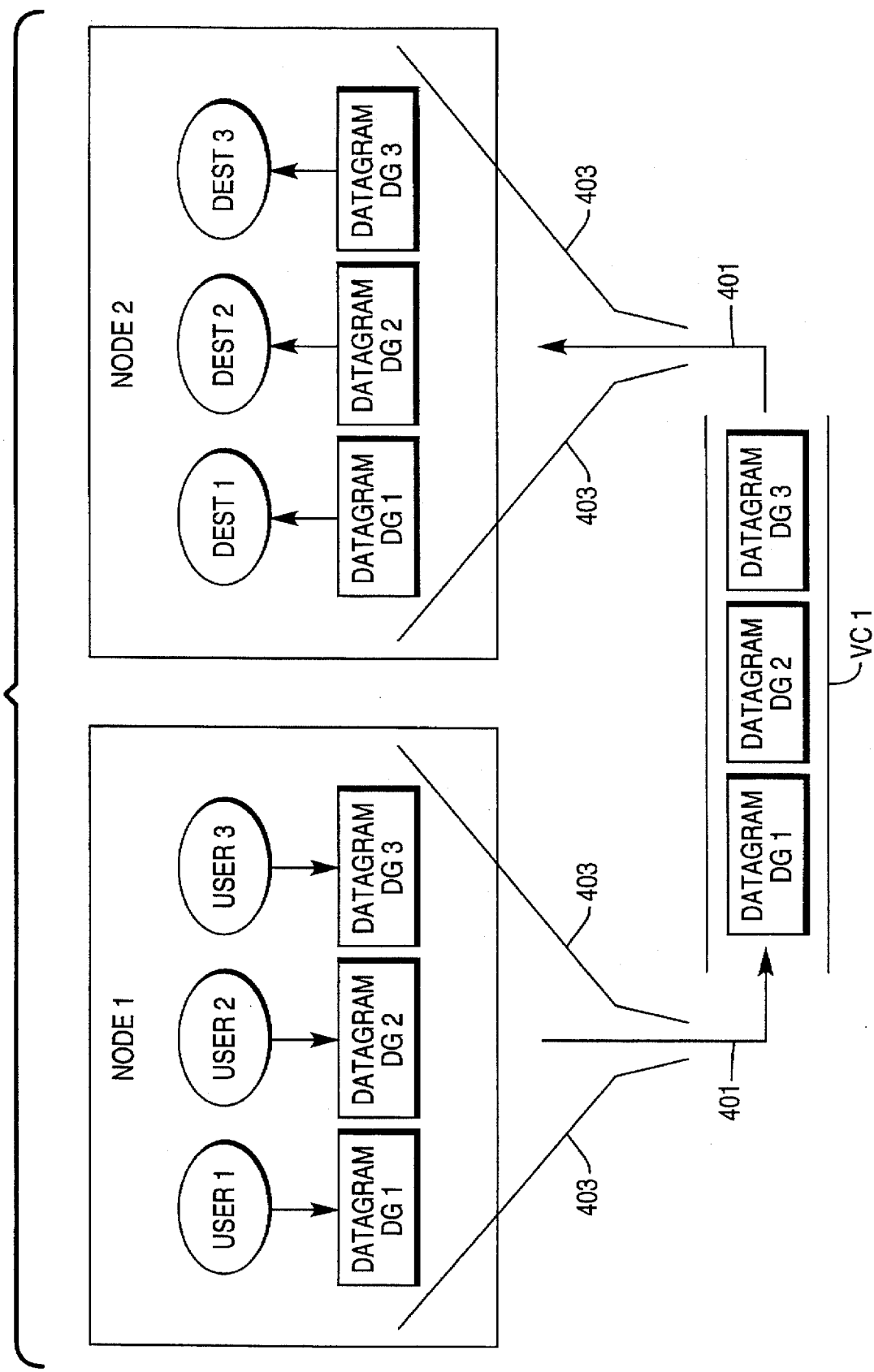
FIG. 4 is a simple block diagram illustration of a process for funneling data packets between nodes in a clustered system, in accordance with the present invention.

As mentioned earlier, the virtual circuit endpoints are maintained within RDSP. During cluster formation, a virtual circuit is setup to every other node in the cluster. For example, a node in a four node cluster has 3 VC endpoints maintained within RDSP, one to each of the other nodes, as illustrated in FIG. 3. Three connections (virtual circuits) are shown connecting with each node shown in FIG. 3. A DLM client process is ignorant of these VCs. When a client wishes to send a data packet to some other node in the cluster, it stamps the data packet with the Ethernet address of this node and hands it over to RDSP. RDSP now locates the VC corresponding to the node (as specified), and funnels the data packet onto the VC for reliable and sequenced transmission, as illustrated in FIG. 4. FIG. 4 shows the funneling of three datagrams, identified as DG 1, DG 2 and DG 3, from Node 1 to Node 2 via virtual circuit VC 1. Arrows 401 and lines 403 have been provided to illustrate the path of transmission of datagrams DG 1, DG 2 and DG 3 from Node 1 to Node 2. We may note here that these VCs are hence fully shared entities, i.e., the same set of VCs are used to provide the communication needs for all DLM clients and daemons on a particular node. The above characteristics of shared virtual circuits will be further analyzed in the following sections.

Keepalives, Acks and Piggy Acks. While a VC is operational, there are two primary packet types that are transmitted on it:

Keepalive/Ack packet. RDSP uses a heartbeat mechanism to ensure that a VC is live. When a VC is busy send/receiving data packets, the heartbeat mechanism is maintained through regular sending and receiving such data packets. When such packets are scarce or not present, RDSP sends out periodic keepalive/ack packet to serve the purpose of a heartbeat. A keepalive packet contains an ack field, containing the sequence number of the last data packet that was reliably received by the sender of the keepalive packet. The keepalive mechanism is kept in check by an inactivity timer. This timer ensures that for a live VC, a keepalive or data packet is received from the other node within a specified amount of time. If this condition is violated, the VC is deemed to have dropped, and the creator of the VC (Control Daemon) is notified of this condition.

User data packet. This is a regular datagram sent out by the user, or a reply being sent out by a DLM daemon process. Each datagram contains a sequence number field that identifies the packet and provides its sequence with respect to other packets in the VC. Each datagram packet also contains an ack field, containing the sequence number of the last data packet that was reliably received by the sender of the data packet.

The ack field in a data packet is commonly referred to as a piggy-ack, since the sender is effectively piggy-backing the ack field (containing acknowledgment of previously received data packets) onto an unrelated data packet being sent out to the host on the other end of the VC. Piggy-acking is utilized by hosts on both ends of a VC and is a very convenient a optimized technique of sending back acknowledgments when a VC is well utilized. If a VC is being scarcely used, it may be necessary to send back an acknowledgment separately. This is done by inserting the ack into the keepalive packet. We may note here that only a user data packet contains a sequence number; a keepalive packet is non-sequenced.

Sliding Window Protocol. RDSP uses a sliding window protocol for its packet acknowledgment scheme. The term window refers to the maximum number of unacknowledged packets that may be in-transit between a sender and a receiver. The window is a tunable and is typically set to 64. This means that up to 64 packets may be sent out to a recipient node without receipt of acknowledgment from the recipient. After 64 packets have been sent, the sender will suspend sending any further packets, until the window eases, i.e., some acknowledgments for the previously sent packets start coming in. This notion of a window is adopted in order to account for transmission and software protocol delays while going from one node to another. The size of the window is set to a value such that these delays will not throttle the flow of data. If the transmission is occurring over a long distance network, it is usually advisable to set the window size to a larger number, to account for the increased transmission delays.

Packet Reordering. As mentioned earlier, an ack field (in a data or ack packet) is the last packet that was reliably received in proper sequence by the recipient. This means that if a packet is received out of order, it may not be ack'ed until the previous packets that complete the sequence are received at the recipient. Such a situation can be handled through a couple of schemes:

Throw away any out of order packet, and assume that the sender will eventually retransmit it.

Reorder packets at the recipient, and form proper sequences before acking packets.

In a multiprocessor environment running multithreaded drivers, the problem of receiving out of order packets is very frequent. Even if the sending side were to present the data packets to the datalink layer in the proper sequence, the act of sending them out on the network may happen in parallel, thus causing packets to overtake each other even before they are transmitted on the network. Further, such overtaking may also occur at the receiving end, where both the datalink layer and the RDSP layer is multithreaded. If the scheme of throwing away out of order packets are used, there will be a constant need to retransmit such packets, thus leading to loss of performance.

RDSP uses a packet reordering scheme at the receiver. In this scheme, a receiver will always queue away an out of order packet indefinitely, until the previous packets required to satisfy proper sequencing are received. The assumption here is that if holes are created due to data loss, these packets will eventually present themselves, due to retransmissions from the sender. If a duplicate copy of a packet is received it is simply discarded. It is interesting to note here that the size of the reorder queue at the receiver is no longer than the size of the sliding window at any point in time.

In order to send out acknowledgments in a timely fashion, RDSP uses an ack timer. This timer ensures that unless an ack has been piggy-acked onto a data packet within a specified amount of time, an ack packet will be generated to send the ack to the sender.

Retransmission of Data. A reliable data transmission scheme needs to have a mechanism for retransmitting data in the event of data loss. Retransmission of data packets is controlled by a retransmission timer. This timer ensures that if the acknowledgment for any packet has not been received within a specified amount of time, the sender will start retransmission of these packets. When the retransmission timer fires, the sender will back up to the lowest sequenced unack'ed packet and retransmit all packets from that point. The sender maintains a queue of all unack'ed packets. The sender backs up to the top of this queue, and retransmits packets until it has either run out of the sliding window, or there are no more packets to transmit. The retransmission scheme is indefinite, i.e., retransmission of a packet is not stopped after it has been retransmitted a finite number of times. The assumption here is that if the receiving node has dropped out of the network, the VC will drop after a finite time, since there will be no keepalives being received from it.

Flow Control. Flow control mechanisms need to be in place, to allow nodes to keep pace with each other. In RDSP, there are two general areas where flow control mechanisms are used:

At the sending end. A sliding window protocol allows only a finite number of unacknowledged packets to be in transit. If there are more packets to transmit, they need to be internally buffered within RDSP. If the internal buffer is also full, RDSP needs to stop receiving packets that are destined to this flow-controlled destination. This is done by flow controlling all write streams to RDSP from users who wish to transmit to this destination. We may note here that at the level of service at the DLM user level is reliable datagrams, the flow control of the user stream will (as a side effect) prevent users from transmitting packets to other destinations as well, until the flow control is released. This is done for purposes of simplicity, the assumption here being is that flow control situations are rare and do not occur during normal DLM traffic. The flow control situation is released when ack's are received from the receiver, which slides forward the sliding window. This allows more packets to be eligible for transmission from the RDSP internal buffer. At this point, all user streams that were flow controlled are released, so that they are able to transmit more packets to this destination and to other destinations as well.

At the receiving end. This flow control scenario refers to the condition whereby a DLM user processes' read stream is backed up to a point that it is not advisable to put any more read data onto it. In the original VC scheme within RDSP, packets are received, reordered and ack'ed before being sent up to their user-level destinations. The act of locating the appropriate recipient process and sending the packet up the user's read stream was an action that was disjoint from the receiving and ack'ing scheme. A simplified flow control scheme was adopted into this design, with the assumption that such flow control situations are rare. The DLM user process would need to have a very large number of requests outstanding in order to be affected. The scheme for flow control at the receiving end is as follows. When a data packet qualifies to be sent up to the appropriate user (i.e., it has met the sequencing criteria), the user process is located and its stream is checked to see if it is excessively backed up. If it is, the data packet is simply discarded. This means that this packet will not be ack'ed by the receiver and the sender has to retransmit it. We assume here that the tardy user process will free up within a reasonable amount of time, during which a number of retransmissions of the data packet will occur.

Figure 5:
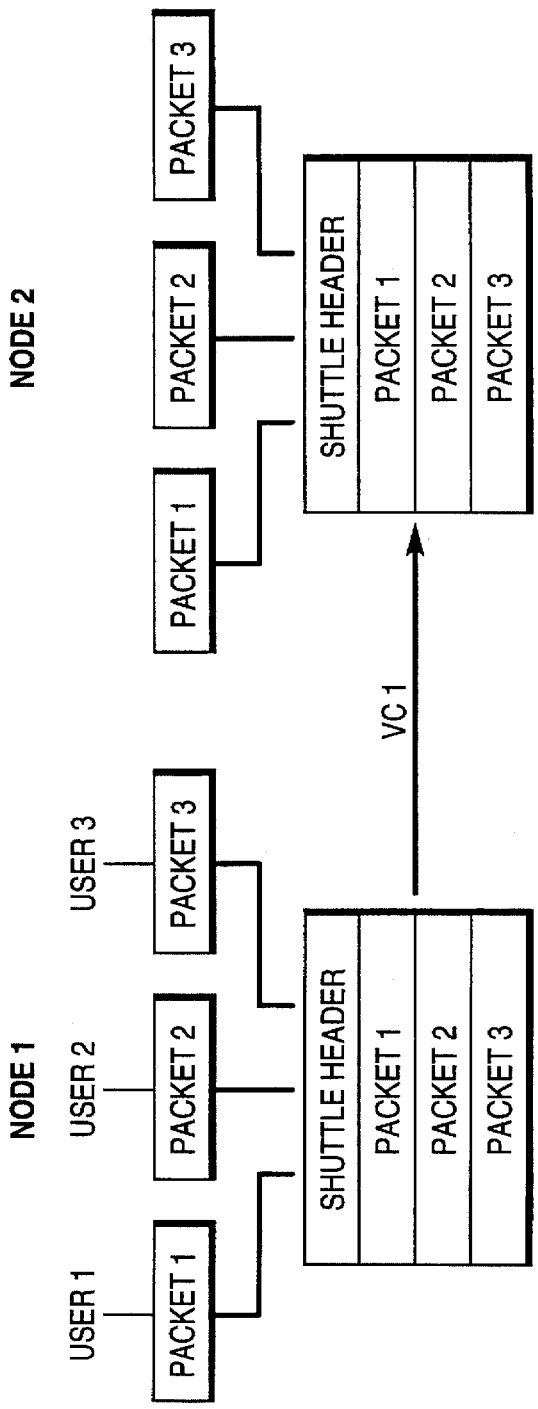
FIG. 5 is a simple block diagram of a process for multiplexing together multiple data packets into shuttles for transmission between nodes within a clustered system, in accordance with the present invention.

The Shuttle Feature. The shuttle feature is an optimization that was incorporated into the RDSP for more efficient use of network resources. It was noted that DLM requests/responses are inherently small sized packets (around 200 bytes long). If each such packet is transmitted as individual network frames, there is a tendency to have lots of small sized frames on the network. Sending small network frames leads to inefficient use of the network, since there is a sizable overhead associated with formatting and sending each frame. The shuttle feature aims at multiplexing such small frames into larger frames at the sending end and then demultiplexing them at the receiving end. This feature is illustrated in FIG. 5. The end user of RDSP is unaffected by this feature since it is done internal to RDSP.

Shuttling is performed within the context of a VC. The data packets within a shuttle may comprise DLM requests and/or responses and may originate from different DLM users. Specifically, the RDSP gathers up a number of such packets that are outbound to the same destination, such as packets 1 through 3 for transmitted from node 1 to node 2 in FIG. 5, and bundles them up into a larger packet called a shuttle. At the receiving end, the shuttle is then split up into its original pieces before being forwarded to respective user processes. We may note here, that the RDSP sequencing scheme (referred to earlier) applies to shuttles, as opposed to individual data packets that comprise the shuttle.

The number of data packets that are used to build a shuttle are decided on the basis of the data traffic rate on the VC. If a VC is sparingly used, shuttling is not appropriate, since the latency to create a shuttle may be too high. The algorithm used to decide the shuttle size allows the size to increase step by step as the throughput on the VC increases, and allows the size to decrease as the throughput decreases. A VC with a reasonably constant data rate will stabilize at a specific shuttle size, in keeping with the data rate.

Expedited Requests/Responses. As discussed above, the shuttle feature has a tendency to add to the latency for resolution of any individual lock request. This is so, since RDSP may sometimes wait for other lock requests/responses to be presented to it before shipping out a shuttle, for purposes of meeting a "target" shuttle size. Although the shuttle feature aims at optimizing the CPU overhead for DLM activities, it does so at the expense of lock resolution latency. In view of this situation, RDSP supports an expedited packet delivery feature.

Sequencing Support

As discussed earlier, the DLM implementation described herein employs a multi-threaded approach for accessing and modifying the DLM lock database. For this reason, there are situations in which more than one process on a node can produce response packets outbound to a remote lock owner. Let us take an example to illustrate this. A process p1, on node A upconverts a lock on resource R. Resource R is mastered on node B. Another process p2, on node B, posts an upconvert on resource R shortly after the upconvert from process p1, generating a notify to p1. Now, the response from p1's upconvert is on the stateless daemon's stream to RDSP, while the notify from p2 is on p2's stream to RDSP. Although the upconvert response was generated chronologically before the notify, the notify may overtake the upconvert response before it is presented to RDSP. This will result in the notify being delivered to p2 before the upconvert response, thus resulting in a breech of API semantics.

The above situation can be remedied with the help of sequencing. In this scheme, each response packet is stamped with a sequence number maintained in the DLM shared memory segment on each node. This way, each response packet generated on a particular node is sequenced in the order in which they were generated, not in the order in which they were presented to RDSP. RDSP on the other hand needs to support a scheme whereby it will reorder response packets from its users such that they are properly sequenced with respect to the sequence number before they are put onto the appropriate VC for delivery to the remote host.

Request and Response Routing

The DLM driver serves as a routing agent for routing of outgoing and incoming datagrams. The routing function is divided into two categories, incoming and outgoing datagrams as outlined in the following subsections.

Routing Incoming Datagrams. Incoming datagrams are routed to recipient user-level processes depending on the type marked on the datagram. The following enumerates the type of datagrams and their routing strategy:

RDSP_UDATAREQ. These are referred to as request datagrams. These datagrams originate from a DLM client performing a lock request on a remotely mastered lock. Such datagrams are first hashed to a stateless daemon from amongst the pool of stateless daemons, and sent up to the appropriate one.

RDSP_SD_SD. These datagrams travel from a stateless daemon on a node to a stateless daemon on another node. Such datagrams are generated during the lock/resource redistribution phase. These datagrams are routed in a similar to request datagrams once they reach their destination node.

RDSP_UDATARESP. These are referred to as response datagrams. These datagrams are generated by stateless daemons as responses to requests sent by DLM clients. Such datagrams carry information within them to allow RDSP to locate the client process to which they need to be routed.

RDSP_CD_CD. These datagrams travel from a control daemon on a node to a control daemon on another node. Such datagrams are generated during the cluster reconfiguration phase, in order to coordinate activities within peer control daemons. The routing process for such datagrams is simple; they are routed to the control daemon for the DLM instance in consideration.

Routing Outgoing Datagrams. All outgoing datagrams generated by user-level processes contain the MAC address of the networking card on the node to which they are destined. These MAC addresses are maintained in the DLM shared memory segment and can be conveniently stamped on by the user process generating the datagram. When an outgoing datagram is presented to RDSP, RDSP uses the supplied MAC address to locate the VC onto which it must post this datagram, for reliable delivery to the destination node. If such a VC is not found the datagram is discarded, otherwise, the datagram is put on a queue of outgoing datagrams for the respective VC.

Cluster Reconfiguration Support

The DLM driver supports various primitives relating to the Datagram Service, that are used by the Control Daemon during cluster reconfiguration. These primitives are outlined below.

VC Setup. During the Cluster Form state, the Control Daemons on all nodes are trying to form connections with other nodes in the cluster. This is done by sending out broadcast join (identification) packets. Upon receipt of a join packet, the Control Daemon verifies that it is from a valid node, and then requests RDSP to form a connection with that node. At this point, RDSP sends out a point-to-point connect packet to that node. For identification purposes, let us assume that node A sent out the connect packet to node B. It is presumed that at some point, node B would also have received a join packet from node A, and its Control Daemon would have instructed RDSP to setup a connection to node A. When this condition exists (i.e., both connecting parties have a connection pending to each other), a connect packet is successfully sent and received by both parties. After the exchange is complete the VC is deemed to be fully setup and operational.

VC Teardown. The shutdown of one or more VCs can occur in a couple of ways.

A control daemon initiated shutdown can occur at various points during cluster reconfiguration. This form of a shutdown may be immediate or graceful, as described below.

Immediate. In this flavor of VC shutdown, one or all circuits are taken down immediately, without regard to pending incoming or outgoing packets. Such a scheme is adopted, for e.g., if a cluster redistribution phase is interrupted by a nested node failure.

Graceful. Currently, this action applies to all VCs. In this mode, RDSP is required to flush through all user streams to ensure there are no outstanding packets on their way down to RDSP, successfully transfer all pending outgoing packets to their destination and then shutdown all VCs.

A shutdown may also occur following the loss of keepalive messaging. If a node has experienced a system crash or is otherwise inoperational, it will cease to transmit packets or keepalive messages on its VCs. At this point, all nodes connected will cease to receive such packets. After a threshold time period has passed without the receipt of a packet from a node, the virtual circuit connecting to the inactive node is shutdown by RDSP, and a notification of this event is sent up to the Control Daemon.

Quiescing ioctls. The Control Daemon uses these ioctls (Input/Output control signals) in order to synchronize and deliver all pending data packets during the cluster quiescing phase. The ioctls in use are the following:

Queue Token. This ioctl is used to ensure that there are no incoming response packets queued up on the read stream of a DLM user. The DLM driver queues a special "token" packet on each read stream. Upon receipt of this packet, the DLM user echoes back a reply on the write stream. When all users have replied to the token packet, the ioctl is complete.

All Deliver. This ioctl is used to ensure that all requests/ responses generated by users and stateless daemons have been flushed down to RDSP and reliably delivered to their respective destinations. This is implemented as a two-step process. In the first step, a mechanism very similar to queue token is used to ensure that there are no packets pending on the write stream. After this step completes, RDSP monitors all VC endpoints until there are no pending outgoing packets; i.e., all such packets have been delivered and acknowledged by their recipients. When all packets have been delivered, RDSP signals completion of the ioctl to the Control Daemon.

It can thus be seen that there has been provided by the present invention a distributed lock manager for a clustered computer system including a datagram messaging system which maintains a network of virtual circuits for the routing of datagrams between nodes within the clustered system.

Although the presently preferred embodiment of the invention has been described, it will be understood that various changes may be made within the scope of the appended claims.

What is claimed is:

1. A distributed lock manager (DLM) for a clustered computer system, said clustered computer system including a plurality of processing nodes and having a plurality of application processes operating within said plurality of processing nodes, said distributed lock manager comprising:
a plurality of virtual circuits, a virtual circuit between each pair of said processing nodes within said clustered computer system; and
within each one of said processing nodes:
a shared memory segment for storing lock status information for said one of said processing nodes, said shared memory segment being shared by said plurality of application processes to access the lock status information stored therein;
a shared library providing said plurality of application processes access to said shared memory segment to request and be granted a lock if said lock is available;
a DLM control program providing exception handling for any exception which occurs with respect to a lock managed within said one of said processing nodes; and
a DLM driver including a communication service providing for the generation of data packets comprising lock manager instructions for transmission to other ones of said processing nodes via said virtual circuits, said communication service also providing for the receipt of data packets generated and transmitted by other ones of said processing nodes, said communication service further including means for testing the integrity of a virtual circuit between a sending processing node and a receiving processing node, said means generating a periodic keepalive message packet which is periodically sent by said sending processing node to said receiving processing node requesting the transmission of an acknowledge signal in response thereto, said keepalive message packet being transmitted in the absence of the receipt of a data packet from said receiving processing node for a predetermined period of time.

2. The distributed lock manager according to claim 3, wherein:
said communication service includes means for limiting the transmission of additional data packets when a predetermined number of data packets have been transmitted without the receipt of acknowledge signals for said transmitted data packets.

3. A distributed lock manager (DLM) for a clustered computer system, said clustered computer system including a plurality of processing nodes and having a plurality of application processes operating within said plurality of processing nodes, said distributed lock manager comprising:
a plurality of virtual circuits, a virtual circuit between each pair of said processing nodes within said clustered computer system;
means for generating and transmitting an acknowledge signal in response to receipt of a data packet at a receiving processing node, said acknowledge signal being attached to a data packet being transmitted by said receiving processing node; and
within each one of said processing nodes:
a shared memory segment for storing lock status information for said one of said processing nodes, said shared memory segment being shared by said plurality of application processes to access the lock status information stored therein;
a shared library providing said plurality of application processes access to said shared memory segment to request and be granted a lock if said lock is available;
a DLM control program providing exception handling for any exception which occurs with respect to a lock managed within said one of said processing nodes; and
a DLM driver including a communication service providing for the generation of data packets comprising lock manager instructions for transmission to other ones of said processing nodes via said virtual circuits, said communication service also providing for the receipt of data packets generated and transmitted by other ones of said processing nodes, said communication service further including means for generating and transmitting an acknowledge signal in response to receipt of a data packet from a sending processing node by a receiving processing node, said acknowledge signal being attached to a data packet being transmitted by said receiving processing node to said sending processing node.

4. In a clustered computer system including a network of processing nodes and a distributed lock manager for coordinating processing activities within the clustered computer system, the improvement comprising:

a plurality of virtual circuits, a virtual circuit between each pair of said processing nodes within said clustered computer system;

a distributed lock manager driver included within each processing node, said driver including a communication service providing for the generation of datagrams comprising lock manager instructions for transmission to other ones of said processing nodes via said virtual circuits, said communication service also providing for the receipt of datagrams generated and transmitted by other ones of said processing nodes; and means for testing the integrity of a virtual circuit between a sending processing node and a receiving processing node, said means generating a periodic keepalive message packet which is periodically sent by said sending processing node to said receiving processing node requesting the transmission of an acknowledge signal in response thereto, said keepalive message packet being transmitted in the absence of the receipt of a data packet from said receiving processing node for a predetermined period of time.

5. In a clustered computer system including a network of processing nodes and a distributed lock manager for coordinating processing activities within the clustered computer system, the improvement comprising:

a plurality of virtual circuits, a virtual circuit between each pair of said processing nodes within said clustered computer system;

a distributed lock manager driver included within each processing node, said driver including a communication service providing for the generation of datagrams comprising lock manager instructions for transmission to other ones of said processing nodes via said virtual circuits, said communication service also providing for the receipt of datagrams generated and transmitted by other ones of said processing nodes; and means for generating and transmitting an acknowledge signal in response to receipt of a data packet at a receiving processing node, said acknowledge signal being attached to a data packet being transmitted by said receiving processing node.

6. The improvement according to claim 5, further comprising:

means for limiting the transmission of additional datagrams when a predetermined number of datagrams have been transmitted without the receipt of acknowledge signals for said transmitted datagrams.

7. A datagram messaging service for a distributed lock manager implemented on a clustered computer system including a plurality of processing nodes, said datagram messaging service comprising:

a plurality of virtual circuits, a virtual circuit between each pair of said processing nodes within said clustered computer system;

a distributed lock manager driver included within each processing node, said driver including a communication service providing for the generation of datagrams comprising lock manager instructions for transmission to other ones of said processing nodes via said virtual circuits, said communication service also providing for the receipt of datagrams generated and transmitted by other ones of said processing nodes; and means for testing the integrity of a virtual circuit between a sending processing node and a receiving processing node, said means generating a periodic keepalive message packet which is periodically sent by said sending processing node to said receiving processing node requesting the transmission of an acknowledge signal in response thereto, said keepalive message packet being transmitted in the absence of the receipt of a datagram from said receiving processing node for a predetermined period of time.

8. A datagram messaging service for a distributed lock manager implemented on a clustered computer system including a plurality of processing nodes, said datagram messaging service comprising:

a plurality of virtual circuits, a virtual circuit between each pair of said processing nodes within said clustered computer system;

a distributed lock manager driver included within each processing node, said driver including a communication service providing for the generation of datagrams comprising lock manager instructions for transmission to other ones of said processing nodes via said virtual circuits, said communication service also providing for the receipt of datagrams generated and transmitted by other ones of said processing nodes; and means for generating and transmitting an acknowledge signal in response to receipt of a datagram at a receiving processing node, said acknowledge signal being attached to a datagram being transmitted by said receiving processing node.

9. The datagram messaging system according to claim 8, further comprising:

means for limiting the transmission of additional datagrams when a predetermined number of datagrams have been transmitted without the receipt of acknowledge signals for said transmitted datagrams.

10. A method for operating a distributed lock manager in a clustered computer system, said clustered computer system including a plurality of processing nodes interconnected by a network, said method comprising the steps of:

establishing a virtual circuit between each pair of said processing nodes within said clustered computer system;

directly sending datagrams comprising lock manager instructions from a sending processing node to a receiving processing node via said virtual circuits, and subsequently directly receiving an acknowledgment signal back from said receiving processing node to said sending processing node; and testing the integrity of a virtual circuit between said sending processing node and said receiving processing node by generating a keepalive message packet which is periodically sent by said sending processing node to said receiving processing node requesting the transmission of an acknowledge signal in response thereto, said keepalive message packet being transmitted in the absence of the receipt of a datagram from said receiving processing node for a predetermined period of time.

11. The method according to claim 10, further comprising the step of limiting the transmission of additional datagrams when a predetermined number of datagrams have been transmitted without the receipt of acknowledge signals for said transmitted datagrams.

12. A method for operating a distributed lock manager in a clustered computer system, said clustered computer system including a plurality of processing nodes interconnected by a network, said method comprising the steps of:

establishing a virtual circuit between each pair of said processing nodes within said clustered computer system;

directly sending datagrams comprising lock manager instructions from a sending processing node to a receiving processing node via said virtual circuits, and subsequently directly receiving an acknowledgment signal back from said receiving processing node to said sending processing node; and generating and transmitting an acknowledgment signal in response to receipt of a datagram from said sending processing node by said receiving processing node, said acknowledge signal being attached to another datagram being transmitted by said receiving processing node to said sending processing node.

* * * * *